United States Patent
Hochstein et al.

4,095,184
June 13, 1978

[54] RADIO TRANSCEIVER POWER BOOSTER

[76] Inventors: Peter A. Hochstein, 14020 15 Mile Rd., Sterling Heights, Mich. 48077; Kelvin Shih, 1481 Skylark Dr., Troy, Ohio 45373

[21] Appl. No.: 737,221

[22] Filed: Nov. 1, 1976

[51] Int. Cl.² .............................................. H04B 1/44
[52] U.S. Cl. ...................................... 325/22; 325/18; 325/144; 325/186; 325/492
[58] Field of Search ...................... 325/15, 18, 21–23, 325/185–187, 117, 144, 492, 151; 340/224, 248 Y, 249; 320/2, 6, 7, 15; 307/46, 48

[56] References Cited
U.S. PATENT DOCUMENTS

| | | | |
|---|---|---|---|
| 2,844,712 | 7/1958 | Noizeux | 325/144 |
| 2,896,073 | 7/1959 | Westphal | 325/186 |
| 3,307,051 | 2/1967 | Parsons | 325/185 |
| 3,327,215 | 6/1967 | Battin et al. | 325/185 |
| 3,364,427 | 1/1968 | Bennett | 325/117 |
| 3,763,415 | 10/1973 | Ownby | 320/6 |

Primary Examiner—Robert L. Griffin
Assistant Examiner—Jin F. Ng
Attorney, Agent, or Firm—McGlynn and Milton

[57] ABSTRACT

A power booster assembly for a transceiver including a secondary rechargeable battery which is charged by a charging circuit during the receive mode of the transceiver and is automatically switched into series with a primary power source to power the transceiver during the transmit mode. A switching circuit connects or switches the secondary battery into series with the primary power source. In a first embodiment of the invention a sampling circuit senses the presence of a radio frequency voltage during the transmit mode to accomplish the switching. In a second embodiment of the invention the sensing circuit is responsive to the power load of the transceiver during the transmit mode to accomplish the switching. An adjustable resistor compensates for the power load differentials between the transmit mode and the receiver mode for different transceiver designs in the second embodiment.

10 Claims, 2 Drawing Figures

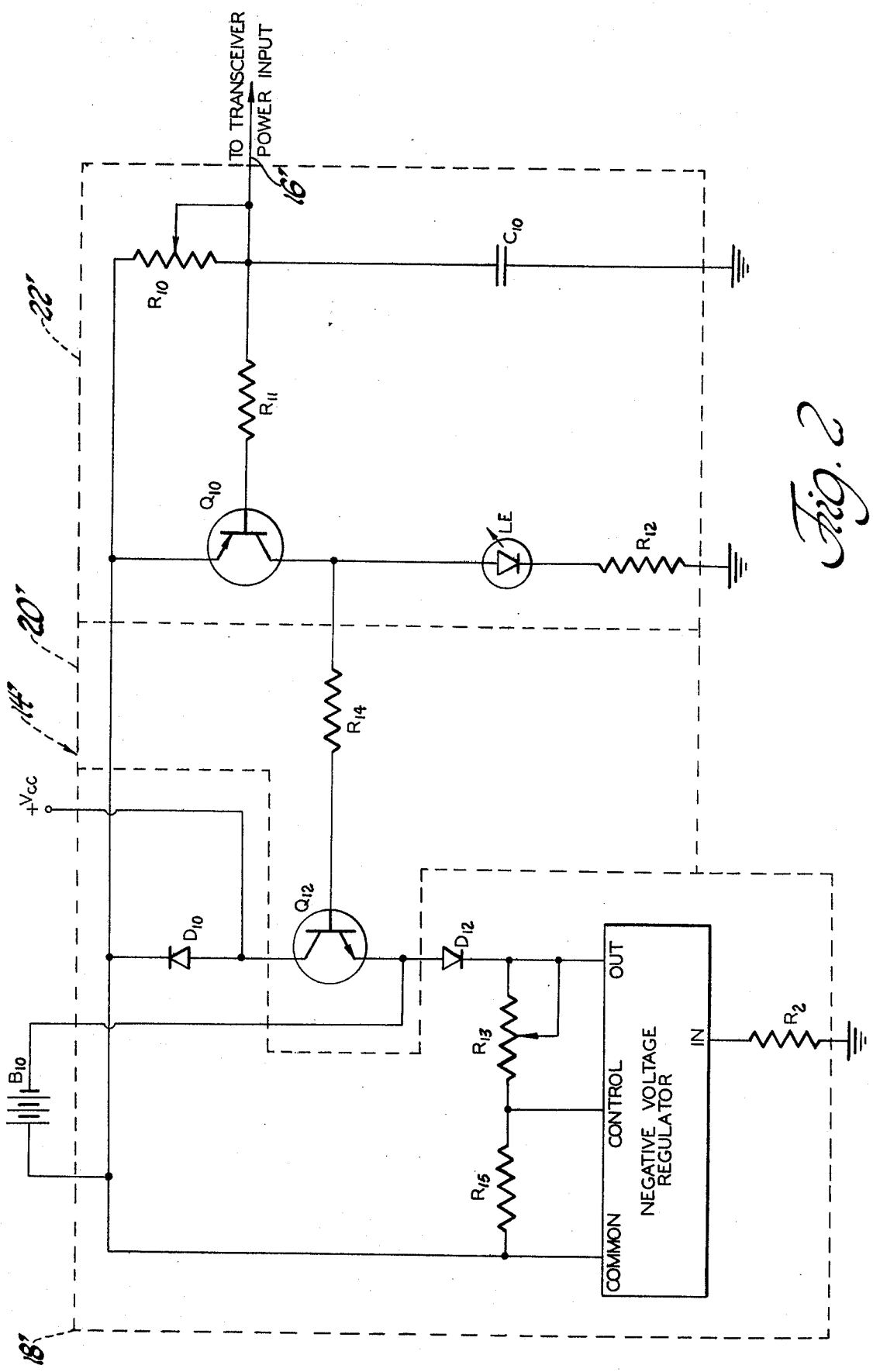

RADIO TRANSCEIVER POWER BOOSTER

BACKGROUND OF THE INVENTION

This invention relates to radio transceivers and, in particular, to radio transceivers having variable or boosted power supplies.

Radio communication transceivers designed for mobile vehicle applications are normally operated directly from the vehicle power supply which power supply consists of a conventional storage battery with an engine-driven charging system. Because most vehicles have a standardized 12 volt electrical system, most mobile radio communication equipment is designed to operate on voltages ranging from 12 volts to 14 volts.

Radio receiving circuits are easily designed to operate efficiently at relatively low voltages. However, transmitter circuits and, more particularly, radio frequency power amplifier circuits operate more efficiently at higher voltages than are typically available from a vehicle electrical system. For example, transistorized radio frequency power amplifier stages are far less costly if they can be operated from a 24 volt direct current power supply rather than a 12 direct current power supply for a given output power. Since the high power, radio frequency amplifier transistors designed for VHF and UHF mobile transceivers are by far the most expensive components in such systems, it is most desirable to operate these radio frequency power amplifier stages at higher voltages. An added benefit of operating at higher voltages, for given output powers, is that the thermal protection circuitry designed to protect the transistors from load mismatches and thermal runaway are less critical. Furthermore, most transceivers used for mobile communications, and especially the low cost citizens band transceivers, are particularly sensitive to power supply voltage variations. For example, a reduction of 2 to 3 volts in supplied power will reduce the radio frequency output power up to one half. Voltage variations of this magnitude are typical in vehicular battery/alternator electrical power sources.

One solution to the above problem is to use a conventional DC to DC solid state inverter to increase the available supply voltage to a transceiver. However, reliable inverters are expensive and exhibit switching noise which, unless well filtered, may interfere with radio reception.

The subject invention overcomes many of the problems of the prior systems by powering the transmitter amplifying stages of the transceiver at a higher voltage than the balance of the circuitry. The present invention can be incorporated into existing transceivers since a nominal increase in operating voltage, such as 25% increase, may be safely handled by most solid state transceivers. In accordance with the subject invention, a secondary power supply is charged from the primary power supply during the receive mode and is automatically switched into series with the primary power supply during the transmit mode.

Accordingly, the subject invention includes a power booster assembly for a transceiver having connection means for connection to a primary power supply and including a secondary power supply and circuit means adapted for electrical connection to the connection means for switching the secondary power supply into and out of series with the primary power supply.

DESCRIPTION OF THE DRAWINGS

Other advantages of the present invention will be readily appreciated as the same becomes better understood by reference to the following detailed description when considered in connection with the accompanying drawings wherein:

FIG. 2 is an electronic circuit constructed in accordance with a second embodiment of the instant invention adapted for electrical connection to a conventional transceiver.

Figure 1:
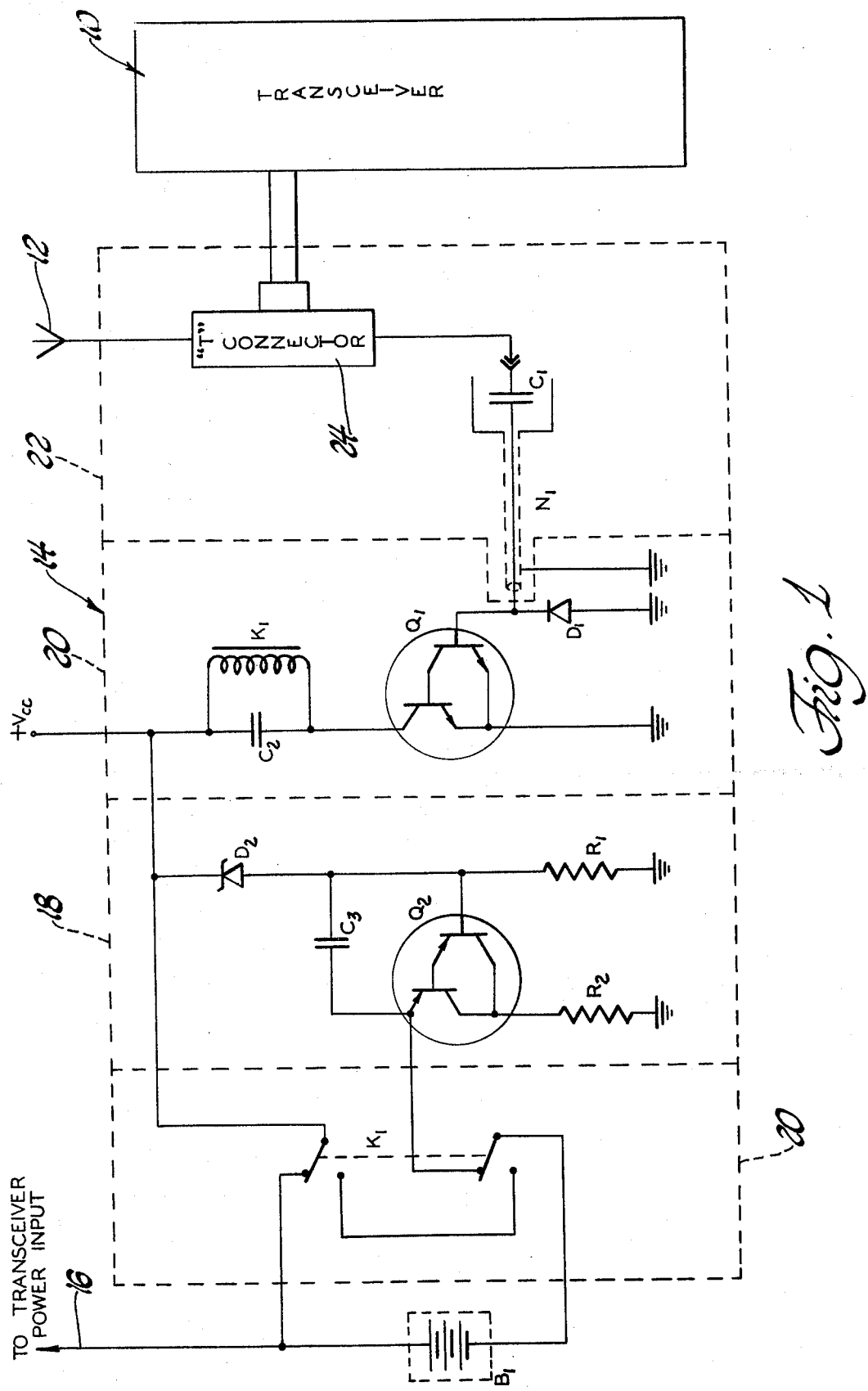
FIG. 1 is an electronic circuit constructed in accordance with a first embodiment of the instant invention electrically connected to a conventional transceiver.

A solid state transceiver is generally indicated at 10 in FIG. 1. Such a transceiver 10 typically includes radio receiving circuits and transmitter circuits, the transmitter circuits including radio frequency power amplifier circuits. The receiving circuits and the transmitter circuits allow the transceiver 10 to operate respectively in a transmit mode and in a receive mode.

In the transmit mode the transceiver 10 transmits radio frequency energy by means of an antenna 12. The transceiver 10 is powered through electrical connection means by a primary power supply, as represented by Vcc, which supplies a 12 volt DC voltage having a negative ground.

The electronic circuit as shown in FIG. 1 includes a secondary power supply or battery $B_1$. The battery $B_1$ may be a rechargeable sealed lead acid cell with a 2.5 ampere hour capacity, available from the Gates Rubber Company. The battery $B_1$ is small, low cost, and also has fast charge characteristics. For purposes of this invention, such a battery, as $B_1$, is adequate for all but the higher powered radio frequency power transceivers.

A circuit means, generally indicated at 14, is provided for switching the battery $B_1$ into and out of series with the connection means comprising the electrical lead 16 extending to the transceiver from the primary power supply Vcc. The circuit means 14 automatically switches the battery $B_1$ into series with the primary power supply Vcc during the transmit mode. The battery $B_1$ is designed to provide a nominal 2 volt boost in power supply voltage to the transceiver 10 which may typically operate at 5 watts. The circuit means 14 and the battery $B_1$, therefore, define a booster assembly.

The battery $B_1$ is rechargeable by a recharging means included in the circuit means 14. The recharging means may comprise the illustrated conventional regulated-voltage, current-limited, charging circuit 18, for recharging the battery $B_1$ during the receive mode of the transceiver 10, during which the charging circuit 18 is electrically connected to the battery $B_1$ to charge the battery $B_1$ from the primary power supply Vcc. The charging circuit 18 includes a 1N4730A Zener diode $D_2$ and a MPSU-95, Darlington amplifier $Q_2$ which charges the battery $B_1$. The charging circuit 18 further includes a 0.05 micro-Farad capacitor $C_3$, a 300 ohm resistor $R_1$ and a 25 ohm resistor $R_2$.

The circuit means 14 also includes a switching means comprising a conventional R.F. carrier, voltage operated relay circuit 20. The relay circuit 20 places the battery $B_1$ in series with the primary power supply during the transmit mode and takes the battery $B_1$ out of electrical contact with the primary power supply and into electrical contact with the charging circuit 18 for recharging the battery $B_1$ during the receive mode. The relay circuit 20 accomplishes the above-noted function by means of double-pole, double-throw relay $K_1$ having a typical resistance of 125 ohms. The relay circuit 20 also includes a rectifying diode, such as the IN914 diode $D_1$, a 2N5308 NPN Darlington transistor $Q_1$ and a 10 micro-Farad capacitor $C_2$ which increases the circuit time constant so that carrier modulation (A.M.) effects are negated.

The circuit means 14 further includes a sensing means or sensing circuit 22. The sensing circuit 22 senses when the transceiver 10 is in its transmit mode and/or its receive mode. The sensing circuit 22 couples the radio frequency carrier emitted at the antenna 12 to the relay circuit 20 by means of a conventional "T" adaptor or connector 24. The connector 24 permits the normal antenna connection and also allows the sensing circuit 22 to sample the presence of a radio frequency carrier.

The sensing circuit 22 includes a 10 pico-Farad capacitor secured within a PL 259 radio frequency connector which is connected to a RG58U coaxial cable, $N_1$. The inclusion of the low value capacitor $C_1$ within the radio frequency connector minimizes the deleterious effects of an increased standing wave ratio at the antenna interconnection point due to impedance mismatches. Unless a capacitor such as $C_1$ is used, mismatch considerations preclude the use of any useful length of coaxial cable such as $N_1$. In other words, the sensing means or sampling means, such as the sampling circuit 22, senses the presence of a radio frequency voltage or radio frequency power during the transmit mode of the transceiver 10. Subsequently, the relay circuit 20, which is electrically coupled to the sensing circuit 22, disconnects the charging circuit 18 from the battery $B_1$ so that the charging circuit 18 is not charging the battery $B_1$, but rather, the battery $B_1$ is placed in series with the primary power supply by means of a double-pole, double-throw relay $K_1$.

The second embodiment of the subject invention will now be described with reference to FIG. 2 wherein structure or apparatus which is the same or similar in function to the apparatus shown in FIG. 1 are shown in primed numerals which numerals correspond to the numerals of FIG. 1.

FIG. 2 also shows a secondary power supply, such as battery $B_{10}$, which has the same electrical characteristics as battery $B_1$. A circuit means 14' performs the same function as the circuit means 14 in that the circuit means 14' switches the battery $B_{10}$ into and out of series with the connection means or lead 16' extending to the transceiver from the primary power supply Vcc.

During the receive mode the transceiver, which is not shown but which is the same as the transceiver 10, derives its operating power through an adjustable resistor $R_{10}$ which has a typical maximum value of 2 ohms and 1N4001 diode, $D_{10}$. The voltage available at the transceiver is the normal vehicle supply voltage Vcc minus the voltage drop across $D_{10}$ and $R_{10}$.

Battery $B_{10}$ is also rechargeable like batter $B_1$. Battery $B_{10}$ is charged by a Fairchild 79MGT2C integrated negative voltage regulator as shown in FIG. 2. The end point voltage of the battery $B_{10}$ is determined by $R_{13}$, a variable resistor with a maximum value of 5 kilo-ohms. The charging current applied to the battery $B_{10}$ by the charging circuit 18' is automatically limited by the negative voltage regulator and may be further reduced by means of $R_L$ which may be of any suitable value. A 1N4001 diode, $D_{12}$, prevents discharge of the battery $B_{10}$ through the negative voltage regulator circuitry. $R_{15}$ has a typical value of 2.2 kilo-ohms.

The circuit means 14' also includes switching means or a switching circuit 20' which is the solid state analogue of the switching circuit 20. The switching circuit 20' places the battery $B_{10}$ in series with the primary power supply during the transmit mode of the transceiver 10 and takes the battery $B_{10}$ out of electrical contact with the primary power supply and into electrical contact with the recharging circuit 18' to recharge the battery $B_{10}$ during the receiving mode of the transceiver 10.

Circuit means 14' also includes sensing means, such as sensing circuit 22', which senses when the transceiver 10 is in the transmit mode or the receive mode by being responsive to the increased power load or current requirement of the transceiver 10 when it is in its transmit mode. When the transceiver 10 is in its transmit mode the increased current requirement of the transceiver 10 causes the voltage drop across $R_{10}$ to exceed 0.7 volts thereby turning on a 2N4402 transistor, $Q_{10}$, through a 33 ohm resistor, $R_{11}$. A light-emitting diode LED placed in series with a 470 ohm resistor, $R_{12}$, indicates when the transistor $Q_{10}$ is in its "on" state. Capacitor $C_{10}$ has a value of 0.1 micro-Farads.

When transistor $Q_{10}$ "turns on", the transistor $Q_{10}$, through $R_{14}$ causes a 2N3055 power switching transistor, $Q_{12}$, of the switching circuit 20' to conduct. When transistor $Q_{12}$ conducts, the battery $B_{10}$ is placed in series with the primary power supply thereby boosting the voltage available to the transceiver 10. Consequently, an isolation diode, $D_{10}$, becomes reversed biased and cannot conduct. At the same time diode $D_{12}$ prevents discharge of the battery $B_{10}$ through the negative voltage regulator circuitry.

The adjustable sensing resistor $R_{10}$ defines an adjustable means for compensating for the powered load differentials between the transmit mode and the receive mode for different transceiver designs. In other words, resistor $R_{10}$ permits the sensing circuit 22' to be adjusted for any given transceiver because the current drain differential for receive and transmit modes varies for different transceivers.

A natural extension of the embodiments of the invention hereinabove described would be to provide multiple parallel charging and series boosting batteries associated to add their respective voltages during the transmit mode of a transceiver.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described herein and yet remain within the scope of the appended claims.

The embodiments of the invention in which an exclusive property or privilege is claimed are defined as follows:

1. A transceiver assembly having a transmit mode and a receive mode for transmitting and receiving radio communication and comprising; a primary power supply, a secondary power supply which is rechargeable, recharging means for recharging said secondary power supply from the primary power supply, and switching means for placing said secondary power supply in series with the primary power supply during the transmit mode of the transceiver and taking said secondary power supply out of direct electrical contact with the primary power supply and into electrical contact with said recharging means for recharging said secondary power supply during the receive mode.

2. An assembly as set forth in claim 1 including sensing means responsive to one of said transmit and receive mode for controlling said switching means.

3. An assembly as set forth in claim 2 wherein said sensing means is responsive to the transmit energy during the transmit mode.

4. An assembly as set forth in claim 3 wherein said sensing means comprises a sampling means for sensing the presence of a radio frequency voltage during said transmit mode.

5. An assembly as set forth in claim 4 wherein said sampling means comprises a connector assembly including a capacitor electrically connected within a radio frequency connector and a coaxial cable connected to the radio frequency connector, and wherein said switching means includes a relay for switching the secondary power supply into and out of series with said primary power supply.

6. An assembly as set forth in claim 2 wherein said sensing means is responsive to the power load during the transmit mode.

7. An assembly as set forth in claim 6 including adjustable means for compensating for the power load differential between the transmit mode and the receive mode.

8. An assembly as set forth in claim 6 wherein said recharging means includes a voltage regulator, said switching means includes a transistor, said sensing means includes a transistor and said adjustable means comprises an adjustable resistor.

9. A power booster assembly for a transceiver having a transmit mode for transmitting radio communication and a receive mode for receiving radio communication and a primary power supply, said assembly comprising; a secondary power supply which is rechargeable, recharging means for recharging said secondary power supply from the primary power supply, and switching means for placing said secondary power supply in series with the primary power supply during the transmit mode and taking said secondary power supply out of direct electrical contact with the primary power supply and into electrical contact with said recharging means for recharging said secondary power supply during the receive mode.

10. An assembly as set forth in claim 9 wherein said circuit means includes sensing means responsive to one of said transmit and receive mode for controlling said switching means.

* * * * *